(12) United States Patent
Burka et al.

(10) Patent No.: US 8,595,462 B2
(45) Date of Patent: Nov. 26, 2013

(54) DYNAMIC MEASUREMENT AND ADAPTATION OF A COPYING GARBAGE COLLECTOR

(75) Inventors: Peter Wiebe Burka, Ottawa (CA); Jeffrey Michael Disher, Ottawa (CA); Daryl James Maier, Unionville (CA); Aleksandar Micic, Ottawa (CA); Ryan Andrew Sciampacone, Nepean (CA)

(73) Assignee: International Business Machines Corporation, Armonk, NY (US)

( * ) Notice: Subject to any disclaimer, the term of this patent is extended or adjusted under 35 U.S.C. 154(b) by 344 days.

(21) Appl. No.: 13/047,786

(22) Filed: Mar. 14, 2011

(65) Prior Publication Data
US 2012/0239901 A1 Sep. 20, 2012

(51) Int. Cl.
*G06F 12/02* (2006.01)
*G06F 17/30* (2006.01)
(52) U.S. Cl.
USPC .......................................... 711/171; 707/818
(58) Field of Classification Search
None
See application file for complete search history.

(56) References Cited

U.S. PATENT DOCUMENTS

| | | | | |
|---|---|---|---|---|
| 5,293,614 | A * | 3/1994 | Ferguson et al. ...................... | 1/1 |
| 6,427,154 | B1 * | 7/2002 | Kolodner et al. ...................... | 1/1 |
| 6,539,464 | B1 * | 3/2003 | Getov ............................. | 711/170 |
| 7,640,544 | B2 | 12/2009 | Flood et al. | |
| 7,783,683 | B2 | 8/2010 | Sekiguchi | |
| 7,895,410 | B1 * | 2/2011 | Wu ................................. | 711/203 |
| 2003/0084266 | A1 * | 5/2003 | Knippel et al. ................. | 711/173 |
| 2007/0136385 | A1 * | 6/2007 | Abrashkevich et al. ....... | 707/200 |
| 2008/0235307 | A1 | 9/2008 | Siegwart et al. | |
| 2010/0077172 | A1 * | 3/2010 | Pizlo ............................. | 711/170 |
| 2010/0287216 | A1 | 11/2010 | Ylonen | |

OTHER PUBLICATIONS

Marlow et al. ("Parallel generational-copying garbage collection with block-structured heap"); ISMM'08, Jun. 7-8, 2008, ACM 978-1-60558-134-7/08/06, pp. 10.*
"The Java HotSpot™ Virtual Machine", A Technical Whitepaper, Sun Microsystems, Sep. 2002.
"Memory Management (Garbage Collection)," last accessed at http://help.sap.com/saphelp_nwesrce/helpdata/en/2a/1cf5a6737c42158048819a3621d205/content.htm, Mar. 2010.
Imai, A., et al.; "Evaluation of Parallel Copying Garbage Collection on a Shared-Memory Multiprocessor," IEEE Transactions on Parallel and Distributed Systems archive, vol. 4, Issue 9, Sep. 1993 (Abstract Only).

(Continued)

*Primary Examiner* — Kaushikkumar Patel
(74) *Attorney, Agent, or Firm* — Nelson and Nelson; Daniel P. Nelson; Alexis V. Nelson

(57) ABSTRACT

An illustrative embodiment of a computer-implemented process for dynamic measurement and adaptation of a parallel copying garbage collector initializes values and data structures, receives an evacuate set, determines whether a new copy block is required and responsive to a determination that a new copy block is required, calculates a size of the new copy block. The computer-implemented process further selects a survivor region from a list of survivor regions to form a selected survivor region, places a lock on the selected survivor region, identifies a number of threads enqueued on the selected survivor region, responsive to a determination that a contention value exceeds a predetermined value, increases a size of the list of survivor regions, evacuates blocks to the selected survivor region and responsive to a determination that more evacuate blocks do not exist, terminates.

20 Claims, 4 Drawing Sheets

(56) References Cited

OTHER PUBLICATIONS

Horvath, Oswin, et al., "Fine-Grained Parallel Compacting Garbage Collection through Hardware-Supported Synchronization," icppw, pp. 118-126, 2010 39th International Conference on Parallel Processing Workshops, 2010, Sep. 13-16, 2010.

Abbas, Adeel, et al. "A Novel Design of a Generational Garbage Collector," Students Conference, Proceedings, IEEE, 2002.

* cited by examiner

Garbage collection system
200

DYNAMIC MEASUREMENT AND ADAPTATION OF A COPYING GARBAGE COLLECTOR

BACKGROUND

1. Technical Field

This disclosure relates generally to memory management in a data processing system and more specifically to dynamic measurement and adaptation of a parallel copying garbage collector in the data processing system.

2. Description of the Related Art

Parallel copying garbage collectors are commonly used as part of the memory management component of a managed runtime such as Java® VM available from IBM®, .NET available from Microsoft®, or the Glasgow Haskell Compiler (IBM is a registered trademark of International Business Machines Corp., in the United States other countries or both, Java is a registered trademark of Oracle and/or affiliates in the United States other countries or both, Microsoft is a registered trademark of Microsoft Corporation in the United States, other countries, or both).

Copying garbage collection is well known and understood in the field. Copying type of collectors have a number of advantages over mark-sweep type of collectors. A copying type of collector inherently compacts the memory heap, reducing fragmentation, and relocates objects using a technique, which naturally improves locality, thereby increasing cache utilization.

A number of design approaches have been applied to copying type collectors to parallelize the copying type of collectors enabling the collectors to effectively exploit the increasing number of computational units available in modern computers. Marlow et al. provide an excellent summary of the current approaches (S Marlow, T Harris, R P James, S Peyton Jones, "Parallel Generational-Copying Garbage Collection with a Block-Structured Heap", ISMM '08 Proceedings of the 7th International Symposium on Memory Management, 2008). Current designs typically establish a size for a newly allocated copy block.

Problem areas of a parallel copying collector typically include work balancing, contention and fragmentation. Work balancing is a problem associated with ensuring parallel threads have sufficient work to maximally utilize respective processing resources. For example, in a parallel system with four threads to maintain optimal performance all four threads are required to perform the same amount of work. When one thread performs most of the work and the other three threads are idle, no benefit is obtained from parallelism.

In typical parallel copying collectors, each collector thread ends up wasting a certain amount of space in each destination region causing fragmentation. The fragmentation occurs because each thread allocates a block of memory in anticipation of copying into the block of memory. On average, half of the last block allocated is wasted. Additionally, small portions of intermediate blocks may be wasted when there is insufficient remaining space to copy a single object, but this type of wastage is typically minimal.

A typical approach to reducing fragmentation due to wastage in the last block allocates smaller copy blocks. However decreasing the size of the allocated blocks has an undesirable effect of increasing contention, because threads must return to the common free pool more often to replenish copy blocks. Kolodner and Petrank (E K Kolodner and E Petrank (IBM), "Parallel Copying Garbage Collection using Delayed Allocation", Parallel Processing Letters, 2004) present a solution to fragmentation, called delayed allocation. However the proposed solution has not been widely used or confirmed in practice, and may lead to an increase in copy conflicts and contention. As the number of generations increases the fragmentation problem also increases. A typical generational garbage collector has two, or at most three, generations.

Contention is another form of problem of ensuring that interactions between parallel threads are minimized, particularly on shared resources. Common sources of contention typically include threads competing to allocate copy blocks from a shared free memory resource, and threads competing to take scanning work from a shared resource. Well-known solutions for reducing contention during allocation of copy blocks allocate larger copy blocks or allocate multiple copy blocks at once. These solutions typically have the undesirable side effect of increasing fragmentation. Contention for scanning work can be reduced with techniques including lock splitting and work stealing. In contrast, a general approach to reducing fragmentation in the literature is to reduce copy-block sizes. The proposed solution is typically not an effective solution especially as the degree of parallelism increases, because it increases contention.

For example, using another proposed solution, objects to be copied are collected together to form a group. The copy operation then copies the group of objects. In another proposed solution, a garbage collector orders object but does not address fragmentation or contention. In yet another proposed solution heap allocation is used to prevent fragmentation and increase load distribution effectiveness during garbage collection using multiple allocation chunks in each thread and segregating objects by size. The proposed solution however may typically reduce object locality and increase fragmentation as generations increase. Therefore there is a need to provide more effective solution addressing requirements of fragmentation and contention in a copying type of garbage collector.

SUMMARY

According to one embodiment, a computer-implemented process for dynamic measurement and adaptation of a parallel copying garbage collector initializes values and data structures, receives an evacuate set, determines whether a new copy block is required and responsive to a determination that a new copy block is required, calculates a size of the new copy block. The computer-implemented process further selects a survivor region from a list of survivor regions to form a selected survivor region, places a lock on the selected survivor region, identifies a number of threads enqueued on the selected survivor region, responsive to a determination that a contention value exceeds a predetermined value, increases a size of the list of survivor regions, evacuates blocks to the selected survivor region and responsive to a determination that more evacuate blocks do not exist, terminates.

According to another embodiment, a computer program product for dynamic measurement and adaptation of a parallel copying garbage collector comprises a computer recordable-type media containing computer executable program code stored thereon. The computer executable program code comprises computer executable program code for initializing values and data structures, computer executable program code for receiving an evacuate set, computer executable program code for determining whether a new copy block is required, computer executable program code responsive to a determination that a new copy block is required, for calculating a size of the new copy block, computer executable program code for selecting a survivor region from a list of survivor regions to form a selected survivor region, computer executable program code for placing a lock on the selected survivor region, computer executable program code for identifying a number of threads enqueued on the selected survivor region, computer executable program code for determining whether a contention value exceeds a predetermined value, computer executable program code responsive to a determination that a contention value exceeds a predetermined value, for increasing a size of the list of survivor regions, computer executable program code for evacuating blocks to the selected survivor region, computer executable program code for determining whether more evacuate blocks exist and computer executable program code responsive to a determination that more evacuate blocks do not exist, for terminating.

According to another embodiment, an apparatus for dynamic measurement and adaptation of a parallel copying garbage collector comprises a communications fabric, a memory connected to the communications fabric, wherein the memory contains computer executable program code, a communications unit connected to the communications fabric, an input/output unit connected to the communications fabric, a display connected to the communications fabric and a processor unit connected to the communications fabric. The processor unit executes the computer executable program code to direct the apparatus to initialize values and data structures, receive an evacuate set, determine whether a new copy block is required, and responsive to a determination that a new copy block is required, calculate a size of the new copy block. The processor unit executes the computer executable program code to further direct the apparatus to select a survivor region to form a selected survivor region, place a lock on the selected survivor region, identify a number of threads enqueued on the selected survivor region and determine whether a contention value exceeds a predetermined value. Responsive to a determination that a contention value exceeds a predetermined value, the processor unit executes the computer executable program code to direct the apparatus to increase a size of the list of survivor regions, evacuate blocks to the selected survivor region, determine whether more evacuate blocks exist and responsive to a determination that more evacuate blocks do not exist, terminate.

BRIEF DESCRIPTION OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Figure 1:
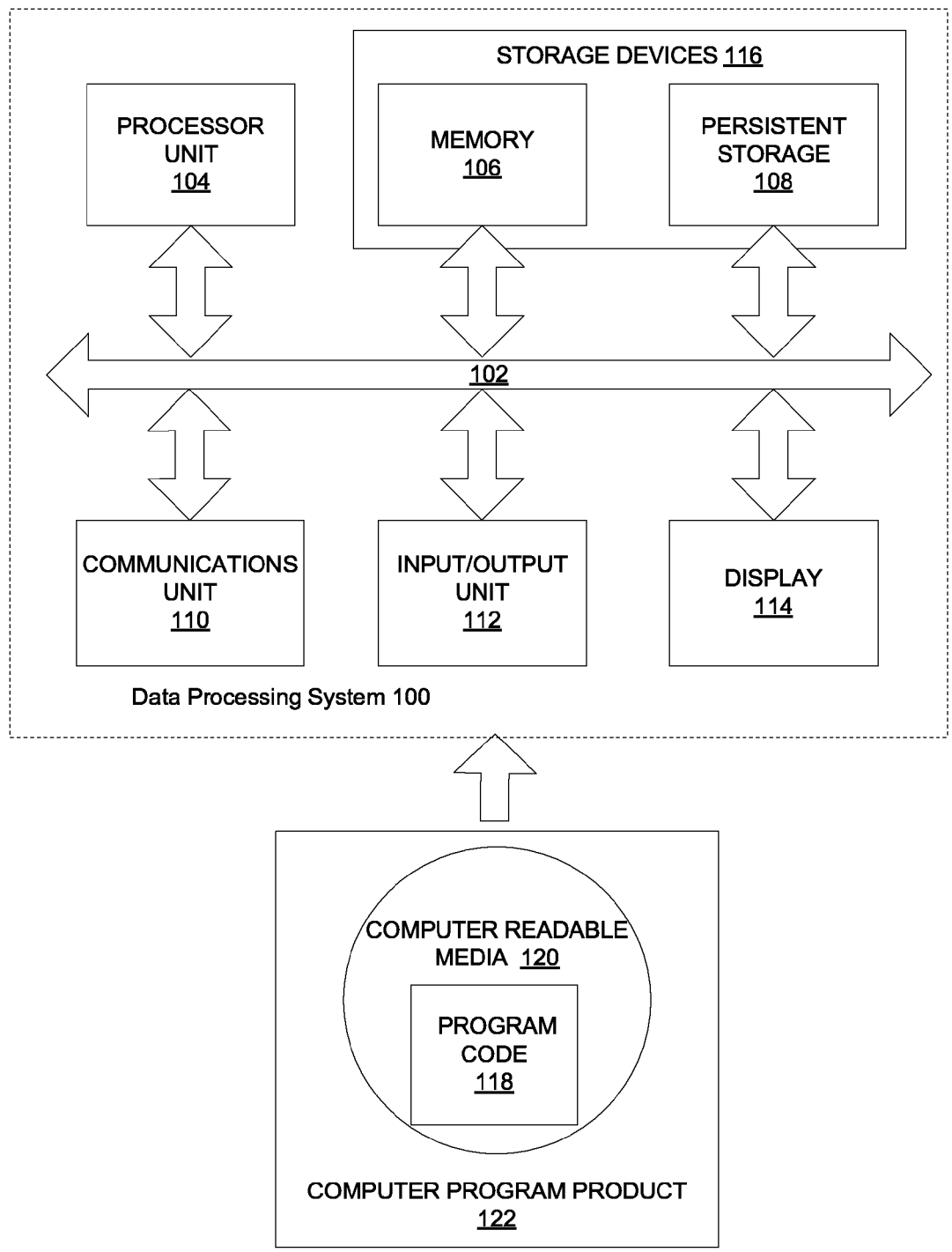
FIG. 1 is a block diagram of an exemplary data processing system operable for various embodiments of the disclosure.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with the computer-readable program code embodied therein, for example, either in baseband or as part of a carrier wave. Such a propagated signal may take a variety of forms, including but not limited to electro-magnetic, optical or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer-readable medium may be transmitted using any appropriate medium, including but not limited to wireless, wire line, optical fiber cable, RF, etc. or any suitable combination of the foregoing.

Computer program code for carrying out operations for aspects of the present disclosure may be written in any combination of one or more programming languages, including an object oriented programming language such as Java™, Smalltalk, C++, or the like and conventional procedural programming languages, such as the "C" programming language or similar programming languages. Java is a registered trademark and all Java-based trademarks and logos are trademarks of Oracle and affiliates, in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or other programmable data processing apparatus to function in a particular manner, such that the instructions stored in the computer readable medium produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Turning now to FIG. 1 a block diagram of an exemplary data processing system operable for various embodiments of the disclosure is presented. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example without limitation, data, program code in functional form, and/or other suitable information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications and/or programs may be located in storage devices 116, which are in communication with processor unit 104 through communications fabric 102. In these illustrative examples the instructions are in a functional form on persistent storage 108. These instructions may be loaded into memory 106 for execution by processor unit 104. The processes of the different embodiments may be performed by processor unit 104 using computer-implemented instructions, which may be located in a memory, such as memory 106.

These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 118 is located in a functional form on computer readable media 120 that is selectively removable and may be loaded onto or transferred to data processing system 100 for execution by processor unit 104. Program code 118 and computer readable media 120 form computer program product 122 in these examples. In one example, computer readable media 120 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 120 also may take the form of a persistent storage, such as a hard drive, a thumb drive, or a flash memory that is connected to data processing system 100. The tangible form of computer readable media 120 is also referred to as computer recordable storage media. In some instances, computer readable media 120 may not be removable.

Alternatively, program code 118 may be transferred to data processing system 100 from computer readable media 120 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative embodiments, program code 118 may be downloaded over a network to persistent storage 108 from another device or data processing system for use within data processing system 100. For instance, program code stored in a computer readable storage medium in a server data processing system may be downloaded over a network from the server to data processing system 100. The data processing system providing program code 118 may be a server computer, a client computer, or some other device capable of storing and transmitting program code 118.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 100 may be any hardware apparatus that may store data. Memory 106, persistent storage 108 and computer readable media 120 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

According to an illustrative embodiment, a computer-implemented process for dynamic measurement and adaptation of a parallel copying garbage collector initializes values and data structures, receives an evacuate set, determines whether a new copy block is required and responsive to a determination that a new copy block is required, calculates a size of the new copy block. The computer-implemented process further selects a survivor region from a list of survivor regions to form a selected survivor region, places a lock on the selected survivor region, identifies a number of threads enqueued on the selected survivor region, responsive to a determination that a contention value exceeds a predetermined value, increases a size of the list of survivor regions, evacuates blocks to the selected survivor region and responsive to a determination that more evacuate blocks do not exist, terminates.

Using data processing system 100 of FIG. 1 as an example, an illustrative embodiment provides the computer-implemented process stored in memory 106, executed by processor unit 104, for dynamic measurement and adaptation of a parallel copying garbage collector initializes values and data structures in storage devise 116. Processor unit 106 receives an evacuate set using communications unit 110, input/output unit 112 or storage devices 116. Processor unit 106 determines whether a new copy block is required and responsive to a determination that a new copy block is required, processor unit 106 calculates a size of the new copy block. Processor unit 106 further selects a survivor region from a list of survivor regions to form a selected survivor region, places a lock on the selected survivor region, identifies a number of threads enqueued on the selected survivor region, and responsive to a determination that a contention value exceeds a predetermined value, increases a size of the list of survivor regions, evacuates blocks to the selected survivor region and responsive to a determination that more evacuate blocks do not exist, terminates.

In an alternative embodiment, program code 118 containing the computer-implemented process may be stored within computer readable media 120 as computer program product 122. In another illustrative embodiment, the process for dynamic measurement and adaptation of a parallel copying garbage collector may be implemented in an apparatus comprising a communications fabric, a memory connected to the communications fabric, wherein the memory contains computer executable program code, a communications unit connected to the communications fabric, an input/output unit connected to the communications fabric, a display connected to the communications fabric, and a processor unit connected to the communications fabric. The processor unit of the apparatus executes the computer executable program code to direct the apparatus to perform the process.

Figure 2:
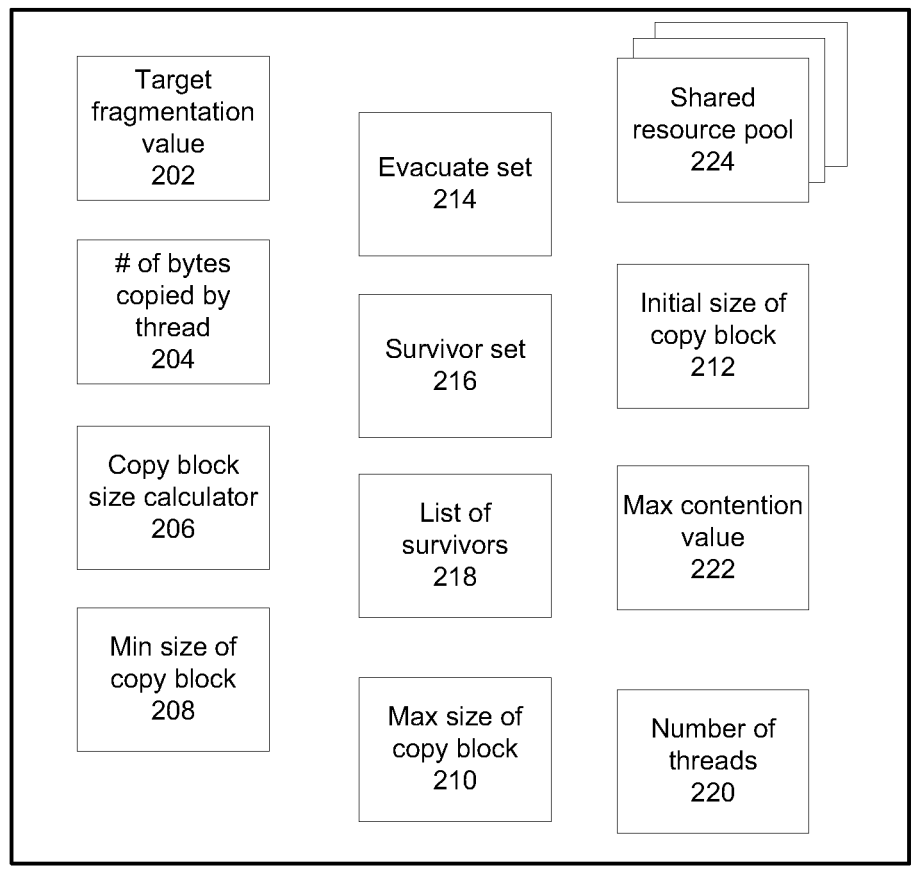
FIG. 2; is a block diagram of a copying garbage collection system, in accordance with various embodiments of the disclosure.

With reference to FIG. 2, a block diagram of a copying garbage collection system, in accordance with various embodiments of the disclosure is presented. Garbage collection system 200 is an example of a parallel copying garbage collection having features of dynamic measurement and adaptation for managing fragmentation and contention.

Garbage collection system 200 is an illustrative embodiment of a highly-parallel copying garbage collector comprising a number of components including target fragmentation value 202, number of bytes copied 204, copy block size calculator 206, minimum size of copy block 208, maximum size of copy block 210, initial size of copy block 212, evacuate set 214, survivor set 216, list of survivors 218, number of threads 220, maximum contention value 222 and shared resource pool 224. Garbage collection system 200 is an example of a garbage collector using a data processing system such as data processing system 100 of FIG. 1 as a foundation. Garbage collection system 200 may also be implemented across data processing systems using a network of data processing system.

Illustrative embodiments of garbage collection system 200 provide a capability to adjust a large number of variables independently including the size of copy-blocks used for each generation in each thread and the number of shared resources from which copy-blocks are allocated in each generation. For example, when using a 64-thread 24-generation configuration there are 88 variables, one variable per thread plus one variable per generation.

Typically, each thread actually allocates one copy-block of memory per generation the thread copies into. This means that the expected wasted space is (nthreads×ngenerations×blocksize×½). For example, a 64-thread collector with 24 generations and relatively small 4 kilobyte copy blocks yields approximately 3 megabytes of space lost due to fragmentation on each garbage collection cycle. The example calculation may be optimistic, because in older generations, wasted space is often far greater than half and 4 kilobyte copy blocks typically result in too much contention for 64 threads. A more realistic copy block size may therefore be 128 kilobytes, resulting in an average wasted space of under 100 megabytes using the same 64-thread 24-generation configuration.

Fragmentation value 202 is a configurable value in a data structure representing an upper bound for the amount of fragmentation permitted as a result of performing a garbage collection process. Fragmentation value 202 is typically a small number expressed as a percentage of total allocated space, but setting the value too small will cause contention. Illustrative embodiments of garbage collection system 200 enable a capability to dynamically adjust parameters in a parallel copying type of garbage collector to target a specific fragmentation percentage while balancing against other factors including the level of contention between threads as the threads compete for resources. The target parameters can either self-adjust or be constrained by the user. The disclosed embodiments enable bounding of resource waste while keeping resource contention low. Fragmentation value 202 may also be referred to as a fragmentation goal.

Number of bytes copied 204 is a count in bytes maintained within a data structure representing the data copied. Copying moves data from a source location to a target location during a garbage collection process. Each garbage collector thread maintains a record of how many bytes have been copied in each generation.

Copy block size calculator 206 provides a capability to determine the size of a copy block to be allocated. The size of the copy block can be adjusted during the garbage collection process using copy block size calculator 206. Minimum size of copy block 208 represents a configurable value establishing a lower threshold value for a size of copy block being allocated. Maximum size of copy block 210 represents a configurable value establishing an upper threshold value for a size of copy block being allocated. Adjusting the size of a copy block is performed between the bounds set by minimum size of copy block 208 and maximum size of copy block 210.

Initial size of copy block 212 is a configurable value maintained in a data structure used to establish an initial sizing of a copy block prior to allocation. The initial value may be determined using prior usage history information. Setting a value of initial size of copy block 212 typically avoids a less than optimal value at the initialization of the copy garbage collection process. Copy-block sizes are set to a small initial size, based on historical data, to minimize fragmentation. As greedy threads are identified within a generation those greedy threads are allowed to allocate larger and larger copy blocks. The size of allocation is increased consistent with a predetermined fragmentation target identified in fragmentation value 202.

Evacuate set 214 is a data structure providing a capability to contain blocks of data which are candidates for recovery in the garbage collection process. In the example of the illustrative embodiments evacuate set 214 represents a number of regions to be evacuated into a different number of regions. Each time a copy-block is allocated, a block of memory must be allocated from a shared resource. The illustrative copying garbage collector uses a region-based (or block-structured) heap. The copying garbage collector is therefore described in terms of regions, although a similar approach could be applied to contiguous heaps.

Survivor set 216, continuing with the current example, is a data structure comprising a set of target regions into which members of evacuate set 214 are copied. Survivor set 216 is described in the current example as a number of regions, wherein the set comprises one or more regions.

List of survivors 218 is a value representing shareable resources. In the example provided shareable resources are referred to as survivor regions which are capable of containing objects evacuated from the evacuate sets. Initially the list has no members but for each new allocation a member is added to the list.

Number of threads 220 is a derived value representing the active threads in the process of copying garbage collection. The number is an indication of the capability of parallelism within the process. A higher value indicates a possible potential for contention.

Maximum contention value 222 is a configurable value representing a desired upper level of contention among threads in the process of copying garbage collection. The value can be set initially and adjusted during processing.

Shared resource pool 224 is a data structure comprising shared copy resources typically initially limited to one shared resource pool per generation. As contention is detected within a generation the number of shared copy resources is increased. Each generation has a predetermined maximum limit on the number of resources, determined by the initial data set in the generation and by the number of garbage collection threads.

Illustrative embodiments typically provide a capability of consistently bettering a fragmentation target while reducing contention to a negligible level. A copying garbage collector as in garbage collection system 200 attempts to provide a configurable upper bound on fragmentation. Illustrative embodiments of copying garbage collector, garbage collection system 200, demonstrate scalability to 64 threads and beyond as opposed to other conventional parallel collectors described in literature having been tested with 8 or fewer threads.

Figure 3:
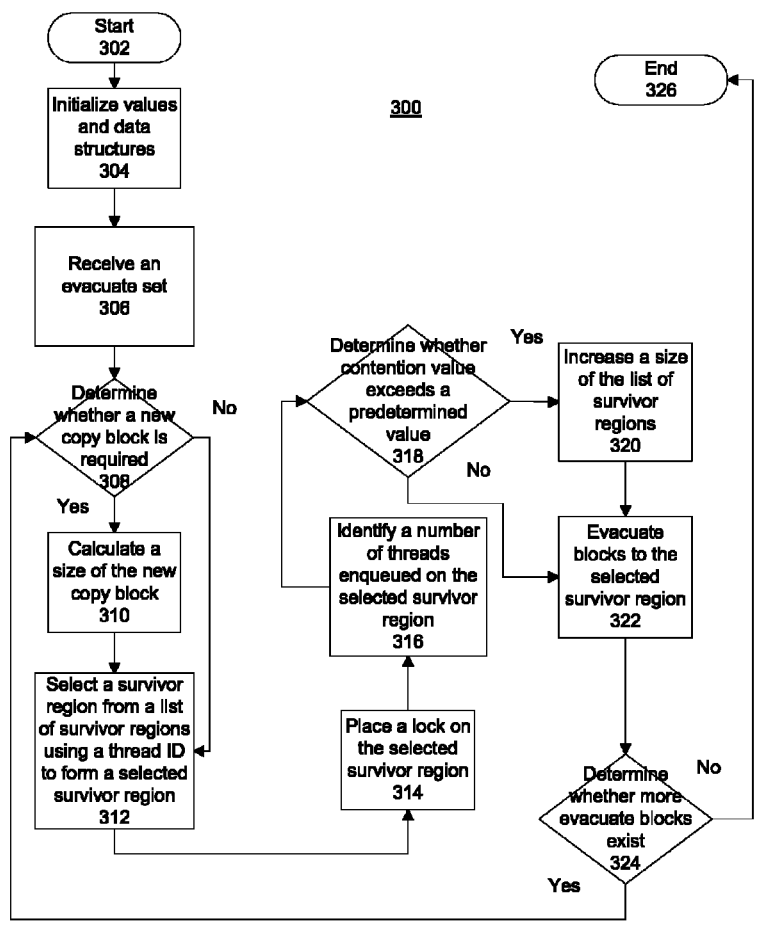
FIG. 3 is a flowchart of a parallel copying garbage collection process, in accordance with one embodiment of the disclosure.

With reference to FIG. 3, a flowchart of a copying garbage collection process, in accordance with one embodiment of the disclosure is presented. Process 300 is an example of a parallel copying garbage collection process using garbage collection system 200 of FIG. 2. Process 300 consists of complementary techniques including limiting fragmentation and limiting contention. The technique of limiting fragmentation dynamically adjusts copy-block sizes to bound internal fragmentation. Internal fragmentation refers to small gaps between objects, which cannot easily be recovered, as opposed to external fragmentation, which are large gaps a memory manager can use for subsequent allocations.

Process 300 starts (step 302) and initializes values and data structures (step 304). Process 300 maintains a global value, which is the target fragmentation value. For example, a target fragmentation value is a small percentage, set as 5%. When the target fragmentation value is made too small threads must compete too much for resources and contention becomes unavoidable.

Initialization of values and data structures include a location in which each garbage collector thread maintains a record of how many bytes have been copied in each generation. At the beginning of the collection the number of bytes copied for each thread value is zero. To simplify implementation and avoid certain corner cases, for example, the size of the first copy block, minimum and maximum values are applied to the copy-block size. Values are retrieved from a storage location including for example, a configuration file or property file. For example, a minimum size of a copy block is set to 768 bytes and the maximum size of a copy block is set to 131072 bytes.

Each generation to be collected consists of a number of regions, which will be evacuated into a different set of regions. These regions are termed the evacuate set (source) and the survivor set (target). Process 300 receives an evacuate region set (step 306). The evacuate set comprising memory blocks to be reclaimed and the survivor set comprising regions that are empty or partially full (contain some free space for evacuated copy blocks). The copying garbage collector of process 300 uses a region-based (or block-structured) heap. The copying garbage collector of process 300 is therefore described in terms of regions, although a similar approach could be applied to contiguous heaps.

Process 300 determines whether a new copy block is required (step 308). When a determination is made that a thread does not require a new copy-block for a particular generation process 300 skips ahead to perform step 312.

When a determination is made that a thread requires a new copy-block for a particular generation (because the previous block is full) process 300 calculates a size of the new copy-block (step 310). The collector of process 300 must assume the copy block could be the last copy block allocated for this thread in this generation. Since, on average, half of the last copy-block is lost to fragmentation, the size for the copy-block is the number of bytes copied multiplied by twice the fragmentation goal. For example, when a fragmentation goal is specified as 5 percent, the new copy-block size is calculated as 10 percent of the bytes copied. Each time a copy-block is allocated, process 300 allocates a block of memory from a shared resource.

Process 300 selects a survivor region from a list of survivor regions using a thread identifier to form a selected survivor region (step 312). Each list of active survivor regions is initialized empty and is expanded to one survivor region the first time a copy-block is allocated in the generation. The survivor region may be allocated from a list of empty regions, or from a list of non-full regions in the generation. Each copying garbage collector thread of process 300 is assigned a unique number at startup and uses this number to select a region in the list from which to attempt allocation.

Process 300, in the form of a thread, places a lock on the selected survivor region (step 314). To evacuate an individual object a copying garbage collection thread of process 300 must first acquire a copy-block in an appropriate survivor region. Allocating a copy-block requires locking a specific survivor region (or at least using a potentially contending atomic instruction). In the copying garbage collector of process 300, each generation has a list of active survivor regions. These are survivor regions which have been allocated for the current generation and which have some free space remaining.

Process 300 identifies a number of threads enqueued on the selected survivor region (step 316). Dynamically adjusting copy-block size successfully bounds fragmentation however dynamic adjustment significantly increases the number of copy-blocks, which must be allocated. This type of adjustment may be a significant source of contention in a highly parallel garbage collector. To reduce contention, a form of lock splitting which dynamically increases the split as contention is detected and provides dynamic upper bounds on the maximum split is employed on subsequent allocations.

Process 300 determines whether a contention value exceeds a predetermined value (step 318). When the thread locks the region to perform the allocation, the thread identifies a number of other threads enqueued ahead to acquire the lock (including the current owner). The number, or count, is a measure of the level of contention on the lock. When a determination is made that a contention value does not exceed a predetermined value, process 300 skips ahead to step 322.

When a determination is made that a contention value exceeds a predetermined value, the thread of process 300 increases the size of the list of survivor regions (step 320). As the size of the list increases, contention decreases since fewer threads are contending on the same regions. However external fragmentation may increase, because there will be more partially filled regions at the end of the collection.

A maximum level of permitted contention could be as simple as a constant, for example a value of 1, but a trivial solution can result in unnecessary growth. A simple function using the number of threads comprising the collector process will typically yield more appropriate values. For example, a function $\log_2$ numThreads, may be used but other functions with similar curves may be equally effective.

The number of threads comprising the collector process naturally bounds the size of the list. Once the list has grown equal to the number of threads, each thread has a region and contention is no longer impossible. However an implementation may artificially limit the length of the list to simplify the implementation or further bound external fragmentation.

Process 300 evacuates blocks to the selected survivor region (step 322). Process 300 determines whether more evacuate blocks exist (step 324). Evacuate blocks are elements of the evacuate set received in step 306.

When a determination is made that more evacuate blocks exist, process 300 loops back to perform step 308 as before. When a determination is made that more evacuate blocks do not exist, process 300 terminates (step 326).

Figure 4:
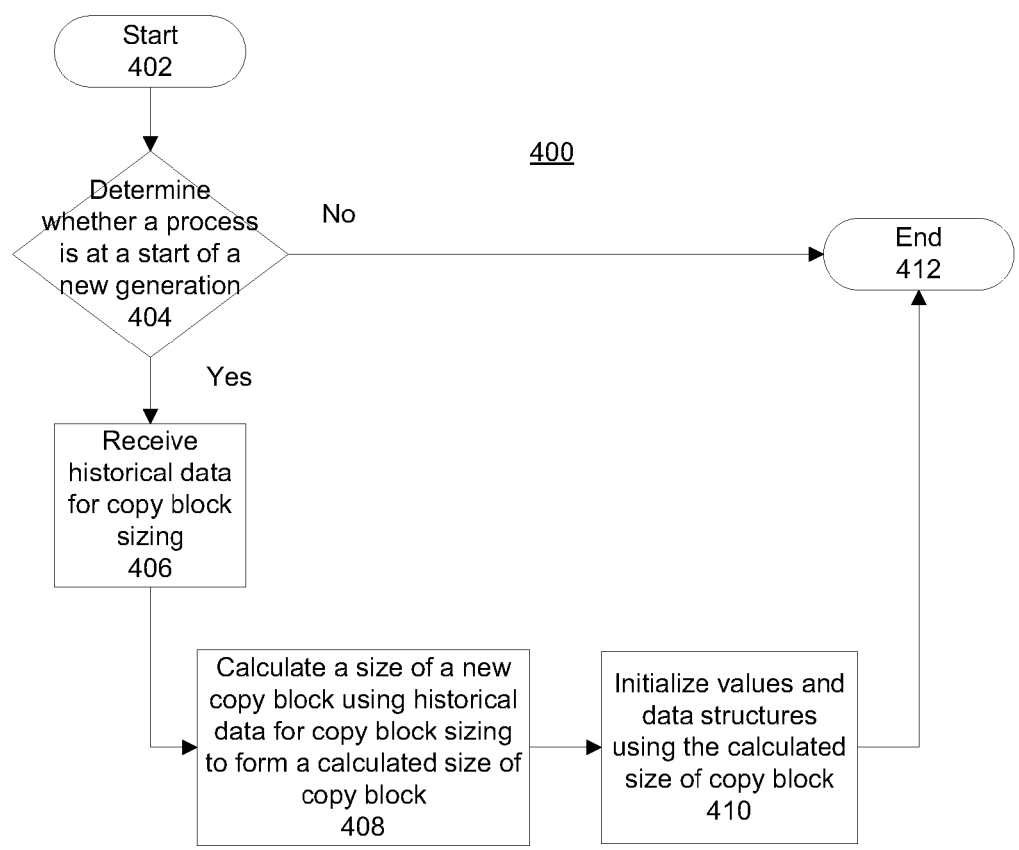
FIG. 4 is a flowchart of a copy block sizing process, in accordance with one embodiment of the disclosure.

With reference to FIG. 4, a flowchart of a copy block sizing process, in accordance with one embodiment of the disclosure is presented. Process 400 is an example of a copy block-sizing alternative in a copying garbage collection process as in exemplary process 300 of FIG. 3.

Using the example of process 300 of FIG. 3 most contention (and subsequent list growth) occurs during early stages of collection while copy-blocks are typically still quite small and the collector is receiving information on the amount of data to be copied in each group.

The early stage contention can be avoided or reduced using historical information to set initial copy-block sizes rather than relying on predetermined minimum and maximum size of copy blocks. The predetermined minimum and maximum size of copy block values are not discarded rather these values remain to form upper and lower bounds and are complimented by a dynamic value for a size of copy block.

Process 400 may be viewed as an alternative portion of step 304 of process 300 of FIG. 3. Process 400 begins (step 402) and determines whether the process is at a start of a new generation (step 404).

When a determination is made that the process is not at the start of a new generation, process 400 terminates (step 412). When a determination is made that the process is at the start of a new generation, process 400 receives historical data for copy block sizing (step 406). Process 400 calculates a size of a new copy block using historical data for copy block sizing (step 408). A minimum copy-block size is calculated for each generation at the beginning of the collection using data from previous collections. For example, a value calculated using an expression of (bytesToEvacuate×historicSurvivalRate×fragmentationTarget)/threadCount may be used to provide a copy block size in the context of the current copy garbage collection process.

Process 400 initializes values and data structures using the calculated size of copy block (step 410). The calculated size of copy block typically falls between the predetermined minimum and maximum size of copy block and typically avoids initial sizing adjustments usually performed in process 300 of FIG. 3.

While the notion of bounding fragmentation is not a new idea, however, the bound is usually a static bound imposed by a current design. Likewise control of contention (for example, lock splitting) is also well understood. However applying these types of techniques to dynamically balance the concerns is a novel process.

Process 300 of FIG. 3 and process 4 of FIG. 4 of a copying garbage collector provide a capability to adapt two elements previously known as factors of fragmentation and contention, namely copy-block size and number of threads that might contend on a shared resource.

The combination of dynamic measurement and adaptation of the exemplary process of a copying garbage collector sets the size for a new allocated copy block at twice the fragmentation goal, increases the number of active survivor regions from which copy blocks are allocated to reduce the potential contention on a lock for each region and increases the number of active survivor regions based on a measure of contention of a region lock. The idea of adaptable thread local heaps for allocation in mark-sweep collectors to reduce contention is known (Dimpsey, R.; Arora, R.; Kuiper, K., Java server performance: A case study of building efficient, scalable JVMs, IBM Systems Journal, Volume: 39 Issue: 1, pp. 151-174, 2000).

Thus is provided in an illustrative embodiment, a computer-implemented process for dynamic measurement and adaptation of a parallel copying garbage collector initializes values and data structures, receives an evacuate set, determines whether a new copy block is required and responsive to a determination that a new copy block is required, calculates a size of the new copy block. The computer-implemented process further selects a survivor region from a list of survivor regions to form a selected survivor region, places a lock on the selected survivor region, identifies a number of threads enqueued on the selected survivor region, responsive to a determination that a contention value exceeds a predetermined value, increases a size of the list of survivor regions, evacuates blocks to the selected survivor region and responsive to a determination that more evacuate blocks do not exist, terminates.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

The invention claimed is:

1. A computer-implemented process for dynamic measurement and adaptation of a parallel copying garbage collector, the computer-implemented process comprising:
   initializing values and data structures;
   receiving an evacuate set;
   determining whether a new copy block is required;
   responsive to a determination that a new copy block is required, calculating a size of the new copy block;
   selecting a survivor region from a list of survivor regions to form a selected survivor region;
   placing a lock on the selected survivor region;
   identifying a number of threads enqueued on the selected survivor region;
   determining whether a contention value exceeds a predetermined value;

responsive to a determination that a contention value exceeds a predetermined value, increasing a size of the list of survivor regions;

evacuating blocks to the selected survivor region;

determining whether more evacuate blocks exist; and responsive to a determination that more evacuate blocks do not exist, terminating.

2. The computer-implemented process of claim 1 wherein initializing values and data structures further comprises:

initializing values including a target fragmentation, number of bytes copied, minimum size of copy block, maximum size of copy block, initial size of copy block, survivor set, list of survivor regions, maximum contention value; and initializing a shared resource pool.

3. The computer-implemented process of claim 1 wherein initializing values and data structures further comprises:

determining whether a process is at a start of a new generation;

responsive to a determination that a process is at a start of a new generation, receiving historical data for copy block sizing;

calculating a size of a new copy block using the historical data for copy block sizing to form a calculated size of copy block; and initializing values and data structures using the calculated size of copy block.

4. The computer-implemented process of claim 1 wherein selecting a survivor region from a list of survivor regions further comprises:

using a thread identifier.

5. The computer-implemented process of claim 1 wherein determining whether a contention value exceeds a predetermined value further comprises:

calculating the predetermined value using a number of threads as a function of $\log_2$ numThreads.

6. The computer-implemented process of claim 1 wherein initializing values and data structures further comprises:

calculating a minimum copy-block size for each generation at a beginning of a collection using data from previous collections using an expression (bytesToEvacuate×historicSurvivalRate×fragmentationTarget)/threadCount.

7. The computer-implemented process of claim 3 wherein calculating a size of a new copy block using the historical data for copy block sizing to form a calculated size of copy block further comprises:

a number of bytes copied multiplied by twice a fragmentation goal.

8. A computer program product for dynamic measurement and adaptation of a parallel copying garbage collector, the computer program product comprising:

a computer recordable-type media containing computer executable program code stored thereon, the computer executable program code comprising:

computer executable program code for initializing values and data structures;

computer executable program code for receiving an evacuate set;

computer executable program code for determining whether a new copy block is required;

computer executable program code responsive to a determination that a new copy block is required, for calculating a size of the new copy block;

computer executable program code for selecting a survivor region from a list of survivor regions to form a selected survivor region;

computer executable program code for placing a lock on the selected survivor region;

computer executable program code for identifying a number of threads enqueued on the selected survivor region;

computer executable program code for determining whether a contention value exceeds a predetermined value;

computer executable program code responsive to a determination that a contention value exceeds a predetermined value, for increasing a size of the list of survivor regions;

computer executable program code for evacuating blocks to the selected survivor region;

computer executable program code for determining whether more evacuate blocks exist; and computer executable program code responsive to a determination that more evacuate blocks do not exist, for terminating.

9. The computer program product of claim 8 wherein computer executable program code for initializing values and data structures further comprises:

computer executable program code for initializing values including a target fragmentation, number of bytes copied, minimum size of copy block, maximum size of copy block, initial size of copy block, survivor set, list of survivor regions, maximum contention value; and computer executable program code for initializing a shared resource pool.

10. The computer program product of claim 8 wherein computer executable program code for initializing values and data structures further comprises:

computer executable program code for determining whether a process is at a start of a new generation;

computer executable program code responsive to a determination that a process is at a start of a new generation, for receiving historical data for copy block sizing;

computer executable program code for calculating a size of a new copy block using the historical data for copy block sizing to form a calculated size of copy block; and computer executable program code for initializing values and data structures using the calculated size of copy block.

11. The computer program product of claim 8 wherein computer executable program code for selecting a survivor region from a list of survivor regions further comprises:

computer executable program code for using a thread identifier.

12. The computer program product of claim 8 wherein computer executable program code for determining whether a contention value exceeds a predetermined value further comprises:

computer executable program code for calculating the predetermined value using a number of threads as a function of $\log_2$ numThreads.

13. The computer program product of claim 8 wherein computer executable program code for initializing values and data structures further comprises:

computer executable program code for calculating a minimum copy-block size for each generation at a beginning of a collection using data from previous collections using an expression of (bytesToEvacuate×historicSurvivalRate×fragmentationTarget)/threadCount.

14. The computer program product of claim 10 wherein computer executable program code for calculating a size of a new copy block using the historical data for copy block sizing to form a calculated size of copy block further comprises:

computer executable program code for calculating a size of a new copy block using a number of bytes copied multiplied by twice a fragmentation goal.

15. An apparatus for dynamic measurement and adaptation of a parallel copying garbage collector, the apparatus comprising:
- a communications fabric;
- a memory connected to the communications fabric, wherein the memory contains computer executable program code;
- a communications unit connected to the communications fabric;
- an input/output unit connected to the communications fabric;
- a display connected to the communications fabric; and
- a processor unit connected to the communications fabric, wherein the processor unit executes the computer executable program code to direct the apparatus to:
- initialize values and data structures;
- receive an evacuate set;
- determine whether a new copy block is required;
- responsive to a determination that a new copy block is required, calculate a size of the new copy block;
- select a survivor region to form a selected survivor region;
- place a lock on the selected survivor region;
- identify a number of threads enqueued on the selected survivor region;
- determine whether a contention value exceeds a predetermined value;
- responsive to a determination that a contention value exceeds a predetermined value, increase a size of the list of survivor regions;
- evacuate blocks to the selected survivor region;
- determine whether more evacuate blocks exist; and
- responsive to a determination that more evacuate blocks do not exist, terminate.

16. The apparatus of claim 15 wherein the processor unit executes the computer executable program code to initialize values and data structures further directs the apparatus to:
- initialize values including a target fragmentation, number of bytes copied, minimum size of copy block, maximum size of copy block, initial size of copy block, survivor set, list of survivor regions, maximum contention value; and
- initialize a shared resource pool.

17. The apparatus of claim 15 wherein the processor unit executes the computer executable program code to initialize values and data structures further directs the apparatus to:
- determine whether a process is at a start of a new generation;
- responsive to a determination that a process is at a start of a new generation, receive historical data for copy block sizing;
- calculate a size of a new copy block using the historical data for copy block sizing to form a calculated size of copy block; and
- initialize values and data structures using the calculated size of copy block.

18. The apparatus of claim 15 wherein the processor unit executes the computer executable program code to select a survivor region from a list of survivor regions further directs the apparatus to:
- use a thread identifier.

19. The apparatus of claim 15 wherein the processor unit executes the computer executable program code to determine whether a contention value exceeds a predetermined value further directs the apparatus to:
- calculate the predetermined value using a number of threads as a function of $\log_2$ numThreads.

20. The apparatus of claim 15 wherein the processor unit executes the computer executable program code to initialize values and data structures further directs the apparatus to:
- calculate a minimum copy-block size for each generation at a beginning of a collection using data from previous collections using an expression of (bytesToEvacuate×historicSurvivalRate×fragmentationTarget)/threadCount.

* * * * *